(12) United States Patent
Cai (10) Patent No.: US 11,429,117 B2
(45) Date of Patent: Aug. 30, 2022

(54) METHOD AND APPARATUS FOR ACQUIRING DATA

(71) Applicant: Baidu Online Network Technology (Beijing) Co., Ltd., Beijing (CN)

(72) Inventor: Xuning Cai, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 215 days.

(21) Appl. No.: 16/670,083

(22) Filed: Oct. 31, 2019

(65) Prior Publication Data

US 2020/0150692 A1 May 14, 2020

(30) Foreign Application Priority Data

Nov. 9, 2018 (CN) .......................... 201811334339.X (51) Int. Cl.
| | | |
|---|---|---|
| *G05D 1/10* | (2006.01) | |
| *B64C 39/02* | (2006.01) | |
| *G01C 21/00* | (2006.01) | |
| *G05D 1/00* | (2006.01) | |

(52) U.S. Cl.
CPC ........... *G05D 1/101* (2013.01); *B64C 39/024* (2013.01); *G01C 21/005* (2013.01); *G05D 1/0088* (2013.01); *B64C 2201/027* (2013.01); *B64C 2201/141* (2013.01)

(58) Field of Classification Search
CPC .... G05D 1/101; G05D 1/0094; G05D 1/0088; B64C 2201/141; B64C 2201/127; B64C 39/024; B64C 2201/027; B64C 2201/14; G01C 21/005; G01C 21/3863; G01C 21/38; G01C 21/20; G01C 21/3694; G08G 1/096844
See application file for complete search history.

(56) References Cited

U.S. PATENT DOCUMENTS

| | | | | |
|---|---|---|---|---|
| 10,514,708 | B2* | 12/2019 | Cheng .................. | G05D 1/0011 |
| 2017/0329335 | A1* | 11/2017 | DelMarco ............. | G01C 21/005 |
| 2017/0358228 | A1* | 12/2017 | Priest .................... | G01S 13/867 |
| 2018/0149479 | A1* | 5/2018 | Tian ....................... | B64D 47/08 |
| 2019/0303668 | A1* | 10/2019 | King ..................... | B64C 39/024 |
| 2019/0362640 | A1* | 11/2019 | Wu ........................ | G05D 1/0094 |
| 2019/0385322 | A1* | 12/2019 | Gu ......................... | G01C 11/06 |
| 2020/0066142 | A1* | 2/2020 | Fowe ..................... | G06V 20/17 |
| 2020/0072610 | A1* | 3/2020 | Hofmann ............. | G06N 3/0454 |
| 2020/0104598 | A1* | 4/2020 | Qian ...................... | G06V 20/20 |
| 2020/0135035 | A1* | 4/2020 | Yuan ..................... | G08G 5/0013 |
| 2020/0363212 | A1* | 11/2020 | Suzuki ................. | G05D 1/0274 |

* cited by examiner

*Primary Examiner* — Christian Chace
*Assistant Examiner* — Shayne M. Gilbertson
(74) *Attorney, Agent, or Firm* — Lathrop GPM LLP (57) ABSTRACT

Embodiments of the present disclosure relate to a method and apparatus for acquiring data. The method includes: receiving map data acquired by a data acquisition apparatus installed on a target unmanned aerial vehicle; recognizing an object in the map data and determining a type of the object; determining, in response to determining that the type of the object matches at least one type in a preset type sequence, a location of the at least one type in the type sequence; and sending a flight height adjusting command to the target unmanned aerial vehicle, based on the location of the at least one type in the type sequence.

11 Claims, 6 Drawing Sheets

METHOD AND APPARATUS FOR ACQUIRING DATA

CROSS-REFERENCE TO RELATED APPLICATIONS

This application claims priority to Chinese Application No. 201811334339.X, filed on Nov. 9, 2018 and entitled "Method and Apparatus for Acquiring Data," the entire disclosure of which is hereby incorporated by reference.

TECHNICAL FIELD

Embodiments of the present disclosure relate to the field of computer technology, specifically to a method and apparatus for acquiring data.

BACKGROUND

Currently, the map data for making an electronic map is generally acquired by a dedicated acquisition vehicle. Since an autonomous vehicle cannot drive automatically before the electronic map is generated, the acquisition of the map data cannot be completed by the autonomous vehicle, but must be completed by a driver driving an acquisition vehicle. At the same time, in the process of acquiring the map data by the acquisition vehicle, the acquisition vehicle must follow traffic rules, and may need to bypass or suffer from traffic jams, resulting in a high acquisition cost and long acquisition period of the map data.

SUMMARY

Embodiments of the present disclosure propose a method and apparatus for acquiring data.

In a first aspect, some embodiments of the present disclosure provide a method for acquiring data, including: receiving map data acquired by a data acquisition apparatus installed on a target unmanned aerial vehicle; recognizing an object in the map data and determining a type of the object; determining, in response to determining that the type of the object matches at least one type in a preset type sequence, a location of the at least one type in the type sequence; and sending a flight height adjusting command to the target unmanned aerial vehicle, based on the location of the at least one type in the type sequence.

In some embodiments, the flight height adjusting command includes a flight height reducing command; and the sending a flight height adjusting command to the target unmanned aerial vehicle, based on the location of the at least one type in the type sequence, includes: sending the flight height reducing command to the target unmanned aerial vehicle, in response to determining that the location is before a preset location, to make the target unmanned aerial vehicle to reduce a flight height.

In some embodiments, the target unmanned aerial vehicle flies along a preset flight route, and the flight height adjusting command includes a flight height raising command; and the sending a flight height adjusting command to the target unmanned aerial vehicle, based on the location of the at least one type in the type sequence, includes: determining an actual width of a ground road corresponding to the flight route; determining a width of a ground area corresponding to the map data as an acquisition width; and sending the flight height raising command to the target unmanned aerial vehicle, in response to determining that the location is after a preset location and the acquisition width is less than the actual width, to make the target unmanned aerial vehicle to raise a flight height.

In some embodiments, the method further includes: determining a coincidence degree of a ground road in the ground area corresponding to the map data and the ground road corresponding to the flight route; determining a ratio of the acquisition width to the actual width; and sending an horizontal flight position adjusting command to the target unmanned aerial vehicle, in response to determining that the coincidence degree is less than the ratio.

In some embodiments, the method further includes: outputting the flight route, in response to determining that the acquisition width is less than the actual width.

In some embodiments, the method further includes: comparing the acquired map data with pre-stored map data to determine a difference between the acquired map data and the pre-stored map data; and generating an electronic map based on the acquired map data, in response to determining that the difference satisfies a preset condition.

In a second aspect, some embodiments of the present disclosure provide an apparatus for acquiring data, including: a data receiving unit, configured to receive map data acquired by a data acquisition apparatus installed on a target unmanned aerial vehicle; an object recognition unit, configured to recognize an object in the map data and determine a type of the object; a location determining unit, configured to determine, in response to determining that the type of the object matches at least one type in a preset type sequence, a location of the at least one type in the type sequence; and a first command sending unit, configured to send a flight height adjusting command to the target unmanned aerial vehicle, based on the location of the at least one type in the type sequence.

In some embodiments, the flight height adjusting command includes a flight height reducing command; and the first command sending unit is further configured to: send the flight height reducing command to the target unmanned aerial vehicle, in response to determining that the location is before a preset location, to make the target unmanned aerial vehicle to reduce a flight height.

In some embodiments, the target unmanned aerial vehicle flies along a preset flight route, and the flight height adjusting command includes a flight height raising command; and the first command sending unit includes: a first determining module, configured to determine an actual width of a ground road corresponding to the flight route; a second determining module, configured to determine a width of a ground area corresponding to the map data as an acquisition width; and a command sending module, configured to send the flight height raising command to the target unmanned aerial vehicle, in response to determining that the location is after a preset location and the acquisition width is less than the actual width, to make the target unmanned aerial vehicle to raise a flight height.

In some embodiments, the apparatus further includes: a coincidence degree determining unit, configured to determine a coincidence degree of a ground road in the ground area corresponding to the map data and the ground road corresponding to the flight route; a ratio determining unit, configured to determine a ratio of the acquisition width to the actual width; and a second command sending unit, configured to send an horizontal flight position adjusting command to the target unmanned aerial vehicle, in response to determining that the coincidence degree is less than the ratio.

In some embodiments, the apparatus further includes: a route output unit, configured to output the flight route, in response to determining that the acquisition width is less than the actual width.

In some embodiments, the apparatus further includes: a difference determining unit, configured to compare the acquired map data with pre-stored map data to determine a difference between the acquired map data and the pre-stored map data; and a map generation unit, configured to generate an electronic map based on the acquired map data, in response to determining that the difference satisfies a preset condition.

In a third aspect, some embodiments of the present disclosure provide a server, including: one or more processors; and a storage apparatus, storing one or more programs thereon, the one or more programs, when executed by the one or more processors, cause the one or more processors to implement the method according to any one of some embodiments in the first aspect.

In a fourth aspect, some embodiments of the present disclosure provide a computer readable medium, storing a computer program thereon, the program, when executed by a processor, implements the method according to any one of some embodiments in the first aspect.

The method and apparatus for acquiring data provided by the above embodiments of the present disclosure, first, may receive map data acquired by a data acquisition apparatus installed on a target unmanned aerial vehicle, secondly, recognize an object in the map data and determine a type of the object, then, match the type of the object and a preset type sequence. When it is determined that the type of the object matches at least one type in the preset type sequence, the location of the at least one type in the type sequence is determined. Finally, the method and apparatus send a flight height adjusting command to the target unmanned aerial vehicle based on the location. Therefore, the method and apparatus may flexibly control the unmanned aerial vehicle to acquire map data of the ground, shortening the acquisition period of the map data.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
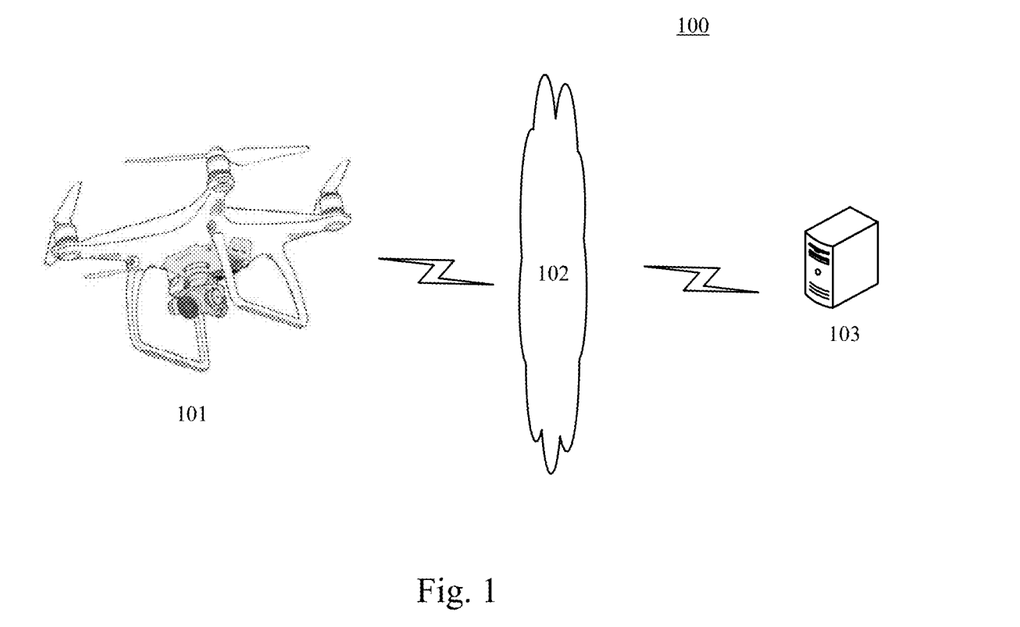
FIG. 1 is a diagram of an example system architecture in which an embodiment of the present disclosure may be implemented.

FIG. 1 illustrates an example system architecture 100 in which a method for acquiring data or an apparatus for acquiring data according to an embodiment of the present disclosure may be implemented.

As shown in FIG. 1, the system architecture 100 may include an unmanned aerial vehicle 101, a network 102, and a server 103. The network 102 serves as a medium providing a communication link between the unmanned aerial vehicle 101 and the server 103. The network 102 may include various types of connections, such as wired or wireless communication links, or optic fibers.

The unmanned aerial vehicle 101 interacts with the server 103 via the network 102 to receive or transmit signals or the like. Various data acquisition apparatuses such as image acquisition apparatuses, and radar sensors, may be installed on the unmanned aerial vehicle 101. The radar sensor may be used to acquire map data of the ground.

The server 103 may be a server that provides various services, such as a backend server that processes the map data acquired by the unmanned aerial vehicle 101. The backend server may process the received map data or the like, and feed back a processing result (for example, a flight height adjusting command) to the unmanned aerial vehicle 101.

It should be noted that the server 103 may be hardware or software. When the server 103 is hardware, the server 103 may be implemented as a distributed server cluster composed of a plurality of servers, or may be implemented as a single server. When the server 103 is software, the server 103 may be implemented as a plurality of software or software modules (for example, for providing distributed services), or as a single software or software module, which is not specifically limited herein.

It should be noted that the method for acquiring data provided by some embodiments of the present disclosure is generally performed by the server 103. Accordingly, the apparatus for acquiring data is generally disposed in the server 103.

It should be understood that the number of terminal devices, networks and servers in FIG. 1 is merely illustrative. Depending on the implementation needs, there may be any number of terminal devices, networks and servers.

Figure 2:
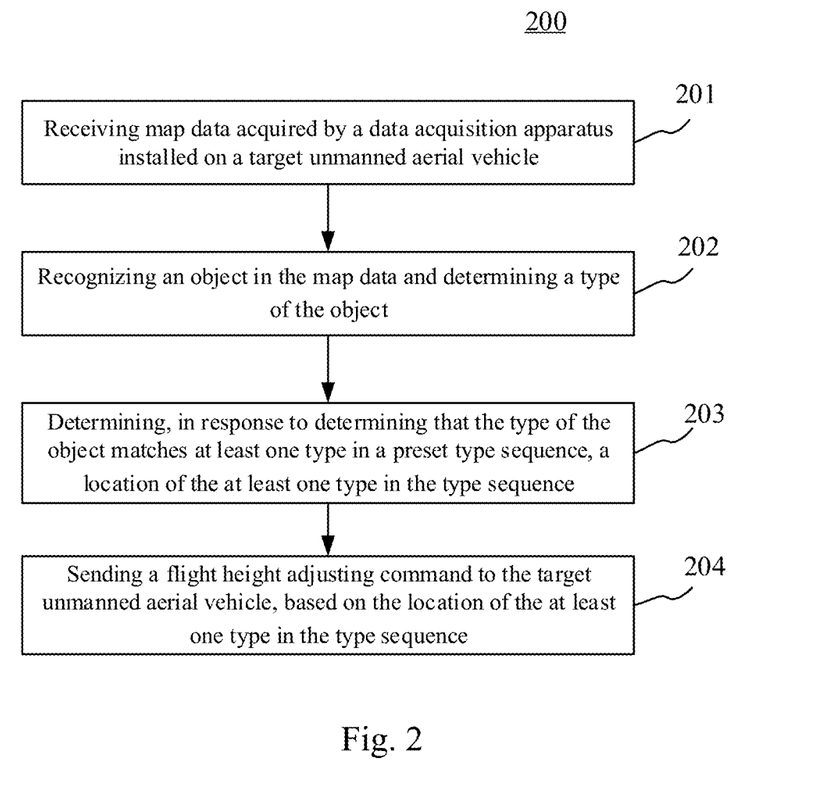
FIG. 2 is a flowchart of a method for acquiring data according to an embodiment of the present disclosure.

With further reference to FIG. 2, a flow 200 of a method for acquiring data according to an embodiment of the present disclosure is illustrated. The method for acquiring data includes the following steps.

Step 201, receiving map data acquired by a data acquisition apparatus installed on a target unmanned aerial vehicle.

In some embodiments, an executing body of the method for acquiring data (for example, the server 103 shown in FIG. 1) may receive the map data acquired by the data acquisition apparatus through a wireless connection. The data acquisition apparatus is installed on the target unmanned aerial vehicle. The data acquisition apparatus may include a camera, a radar sensor, or the like. The map data refers to data for constructing an electronic map, which may include road information, building information, traffic sign information, or the like. The map data may be image data or point cloud data.

It should be noted that the wireless connection may include but is not limited to 3G/4G connection, WiFi connection, Bluetooth connection, WiMAX connection, Zigbee connection, UWB (ultra wideband) connection, or other wireless connections that are now known or to-be-developed in the future.

Step 202, recognizing an object in the map data and determining a type of the object.

In some embodiments, after obtaining the map data, the executing body may recognize the object in the map data. The object may include cars, bicycles, lane lines, or the like. In addition, the executing body may also determine the type of the object. The type of the object may include vehicles, pedestrians, trees, buildings, traffic signs, or the like. Specifically, if the map data is image data, the executing body may perform image recognition using various algorithms to determine the object included in the image data. If the map data is point cloud data, the executing body may perform point cloud recognition using various algorithms to determine the object included therein. It may be understood that image recognition and point cloud recognition are relatively mature existing technologies, and detailed description thereof will be omitted.

Step 203, determining, in response to determining that the type of the object matches at least one type in a preset type sequence, a location of the at least one type in the type sequence.

After determining the type of the object in the map data, the executing body may match the type with the preset type sequence. In some embodiments, the types in the type sequence may be sorted according to the size of the corresponding object. For example, the size of the building corresponding to the type "building" is larger than the size of various vehicles corresponding to the type "vehicle", and the size of the various vehicles corresponding to the type "vehicle" is larger than the size of various signs corresponding to the type "traffic sign". The type sequence may then be building-vehicle-traffic sign.

If the executing body determines that the type matches at least one type in the preset type sequence, the location of the matched type in the type sequence may be determined. In some embodiments, the location may be represented by a serial number. The smaller the serial number, the closer the location is to the front. It may be understood that the closer the location is to the rear, the smaller the size of the object that may be recognized, and the higher the accuracy of the recognition.

Step 204, sending a flight height adjusting command to the target unmanned aerial vehicle, based on the location of the at least one type in the type sequence.

After determining the above location, the executing body may send the flight height adjusting command to the target unmanned aerial vehicle, based on the location. Specifically, the executing body may first determine the maximum value of the serial number according to the serial number of each location. It may be understood that the type in the type sequence corresponding to the maximum value of the serial number is the object of the smallest size that the executing body can recognize. The executing body may send the flight height adjusting command to the target unmanned aerial vehicle based on the maximum value of the serial number. The flight height adjusting command may include a flight height reducing command and a flight height raising command. The flight height reducing command is used to instruct the target unmanned aerial vehicle to reduce its own flight height. The flight height raising command is used to instruct the target unmanned aerial vehicle to raise its own flight height.

In some alternative implementations of some embodiments, the step 204 may be specifically implemented by the following steps not shown in FIG. 2: sending the flight height reducing command to the target unmanned aerial vehicle, in response to determining that the location is before a preset location, to make the target unmanned aerial vehicle to reduce a flight height.

If the executing body determines that the location is before the preset location, the flight height reducing command may be sent to the target unmanned aerial vehicle to make the target unmanned aerial vehicle to reduce the flight height. Here, the preset location may refer to the location of the type of the object that needs to be recognized. If the above location is before the preset location, it indicates that the current map data cannot recognize the object that needs to be recognized, and the flight height of the target unmanned aerial vehicle needs to be reduced. For example, the preset location refers to the location of the type "traffic sign" in the type sequence. However, the location of the type "vehicle" matching the type of the object in the type sequence is located before the location of the type "traffic sign", indicating that the executing body cannot recognize the object of the type "traffic sign" from the map data. The map data does not meet the requirements. At this time, the flight height of the target unmanned aerial vehicle should be appropriately reduced so that the map data acquired by the data acquisition apparatus on the target unmanned aerial vehicle meets the requirements.

Figure 3:
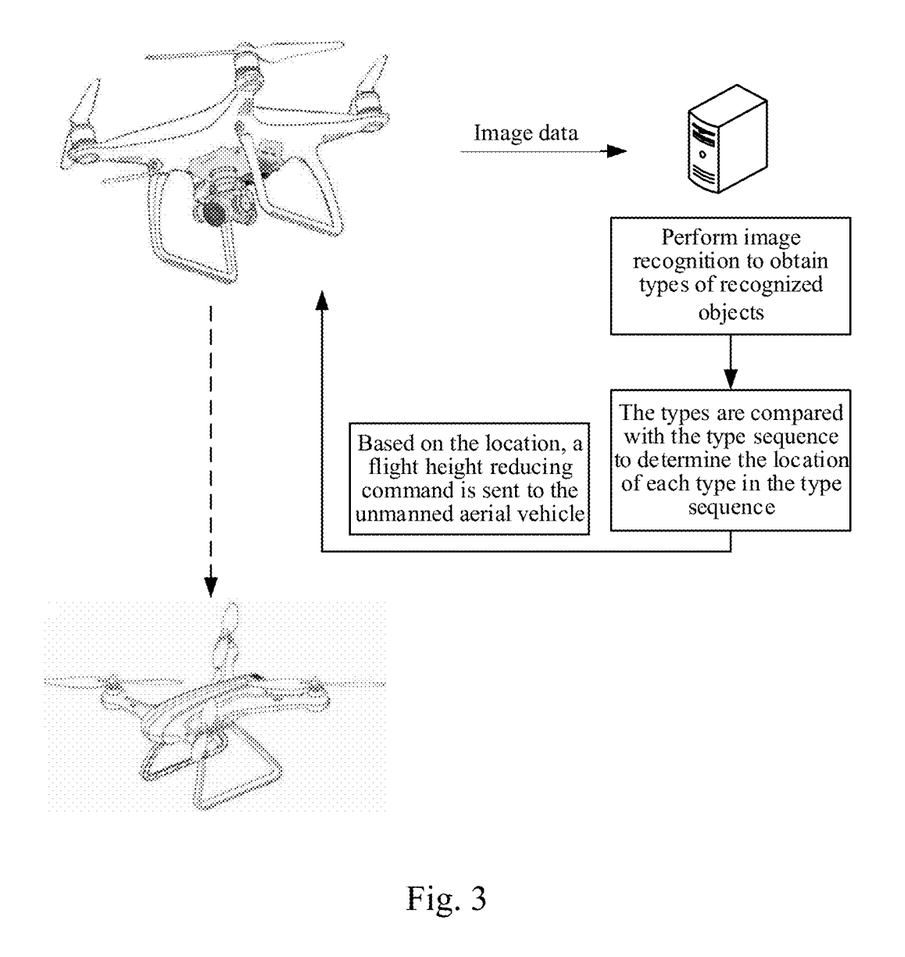
FIG. 3 is a schematic diagram of an application scenario of the method for acquiring data according to an embodiment of the present disclosure.

With further reference to FIG. 3, FIG. 3 is a schematic diagram of an application scenario of the method for acquiring data according to some embodiments. In the application scenario of FIG. 3, the camera installed on the unmanned aerial vehicle sends image data to the server. After receiving the image data, the server performs image recognition to obtain types of recognized objects. The types are then compared with the type sequence to determine the location of each type in the type sequence. Finally, based on the location, a flight height reducing command is sent to the unmanned aerial vehicle. The unmanned aerial vehicle reduces its flight height after receiving the flight height reducing command.

The method for acquiring data provided by some embodiments of the present disclosure, first, may receive map data acquired by a data acquisition apparatus installed on a target unmanned aerial vehicle, secondly, recognize an object in the map data and determine a type of the object, then, match the type of the object and a preset type sequence. When it is determined that the type of the object matches at least one type in the preset type sequence, the method determines the location of the at least one type in the type sequence. Finally, the method sends a flight height adjusting command to the target unmanned aerial vehicle based on the location. Therefore, the method may flexibly control the unmanned aerial vehicle to acquire map data of the ground, and the flight of the unmanned aerial vehicle is not limited by the ground traffic signal, thereby shortening the acquisition period of the map data.

Figure 4:
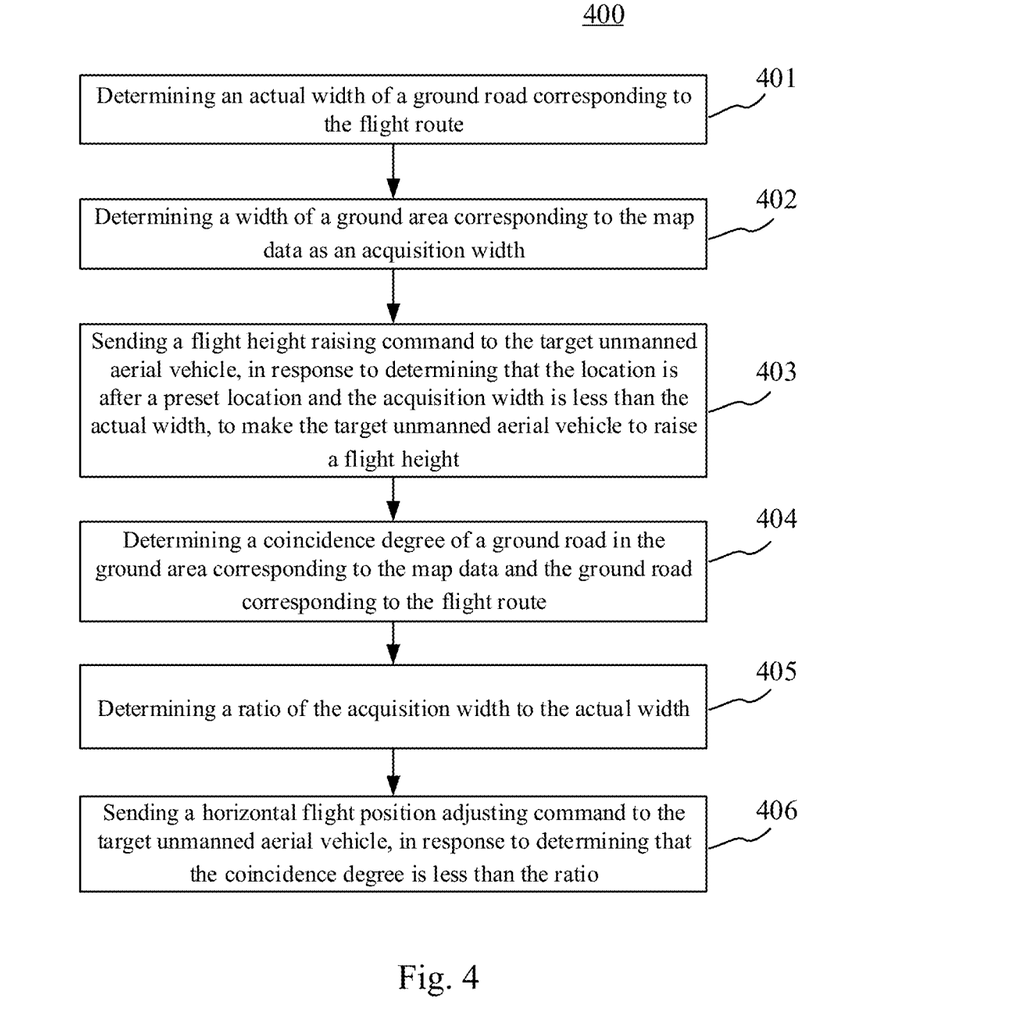
FIG. 4 is a flowchart of the method for acquiring data according to another embodiment of the present disclosure.

With further reference to FIG. 4, a flow 400 of the method for acquiring data according to another embodiment of the present disclosure is illustrated. In some embodiments, the target unmanned aerial vehicle flies along a preset flight route. As shown in FIG. 4, the method of some embodiments may include the following steps not shown in FIG. 2.

Step 401, determining an actual width of a ground road corresponding to the flight route.

The executing body may determine the corresponding ground road based on the flight route of the target unmanned aerial vehicle, and then determine the actual width of the ground road.

Step 402, determining a width of a ground area corresponding to the map data as an acquisition width.

The executing body may also determine the ground area corresponding to the map data, and define the width of the ground area as the acquisition width. The data acquisition apparatus on the target unmanned aerial vehicle may not be able to completely acquire all the data of the ground road during the acquisition process. For example, the width of the ground road is the wide of 8 lanes, but the width of the ground area corresponding to the map data is only equivalent to the wide of 3 lanes.

Step 403, sending a flight height raising command to the target unmanned aerial vehicle, in response to determining that the location is after a preset location and the acquisition width is less than the actual width, to make the target unmanned aerial vehicle to raise a flight height.

If the location is after the preset location, it means that the executing body can recognize the object of a specific type through the currently acquired map data. At this time, the executing body confirms that the map data meets the requirements. At this time, if the executing body further determines that the acquisition width is less than the actual width, the flight height raising command may be sent to the target unmanned aerial vehicle to make the target unmanned aerial vehicle to raise the flight height. It may be understood that after the target unmanned aerial vehicle raises the flight height, the field of view of the data acquisition apparatus installed on the target unmanned aerial vehicle becomes larger, and the acquisition width becomes larger.

In some alternative implementations of some embodiments, after the target unmanned aerial vehicle raises the flight height, the executing body may further perform image recognition on the map data acquired by the data acquisition apparatus installed on the target unmanned aerial vehicle to ensure that the location of the type matching the type of the recognized object in the type sequence is after the preset location.

Step 404, determining a coincidence degree of a ground road in the ground area corresponding to the map data and the ground road corresponding to the flight route.

The executing body may also determine the ground road in the ground area corresponding to the map data, and determine the coincidence degree of the above ground road and the ground road corresponding to the flight route. During the acquisition process, there may be a situation where the target unmanned aerial vehicle's flight position is not directly above the ground road. At this time, the map data may not include complete information about the ground road. By calculating the coincidence degree, it is possible to judge the completeness of the ground road information included in the map data. If the coincidence degree is 100%, it indicates that the map data includes the complete information about the ground road.

Step 405, determining a ratio of the acquisition width to the actual width.

The executing body may also determine the ratio of the acquisition width to the actual width.

Step 406, sending a horizontal flight position adjusting command to the target unmanned aerial vehicle, in response to determining that the coincidence degree is less than the ratio.

If the coincidence degree is less than the ratio, it indicates that the flight position of the target unmanned aerial vehicle is not directly above the ground road. The map data includes information of other areas than the ground road. At this time, the executing body may send the horizontal flight position adjusting command to the target unmanned aerial vehicle. After receiving the command, the target unmanned aerial vehicle may adjust the horizontal flight position to increase the value of the coincidence degree. Thus, with the adjusted target unmanned aerial vehicle, the data acquired by the data acquisition apparatus may include more information of the ground road.

In some alternative implementations of some embodiments, the method may further include the following step not shown in FIG. 4: outputting the flight route, in response to determining that the acquisition width is less than the actual width.

When the executing body determines that the acquisition width is less than the actual width, it indicates that the ground road is wide, and using one unmanned aerial vehicle may not be able to acquire the complete information of the ground road. The executing body may output the flight route of the unmanned aerial vehicle. Specifically, the executing body may send the flight route to other unmanned aerial vehicles to fly according to the flight route, and acquire information of the ground road that has not been acquired.

In some alternative implementations of some embodiments, the method may further include the following steps not shown in FIG. 2: comparing the acquired map data with pre-stored map data to determine a difference between the acquired map data and pre-stored map data; and generating an electronic map based on the acquired map data, in response to determining that the difference satisfies a preset condition.

After obtaining the map data, the executing body may compare the map data with the pre-stored map data to determine the difference between the acquired map data and pre-stored map data. The pre-stored map data may be stored in advance in the executing body locally or may be stored in advance in another storage device in communication connection with the executing body. The pre-stored map data may be image data or point cloud data. It may be understood that the acquisition time of the pre-stored map data is earlier than the acquisition time of the map data.

After determining the difference between the acquired map data and the pre-stored map data, the executing body may determine whether the difference satisfies the preset condition. If it satisfies the preset condition, the electronic map is generated based on the acquired map data. The preset condition may be a condition for defining the type of an object corresponding to the difference, and may also be a condition for defining the distance of the difference of the object. For example, if the difference is a change of a lane line, the object corresponding to the difference is a lane line. The preset condition may be that the type of the object is a lane line. Alternatively, the difference is a change in the position of the traffic signal. The preset condition may be that the change distance is greater than 3 meters. The executing body may generate the electronic map according to the relative position between the objects (lane line, median strip, building, etc.) in the map data.

The method for acquiring data provided by some embodiments of the present disclosure may flexibly control the unmanned aerial vehicle to accurately acquire information of the ground road, making the acquired map data more accurate.

Figure 5:
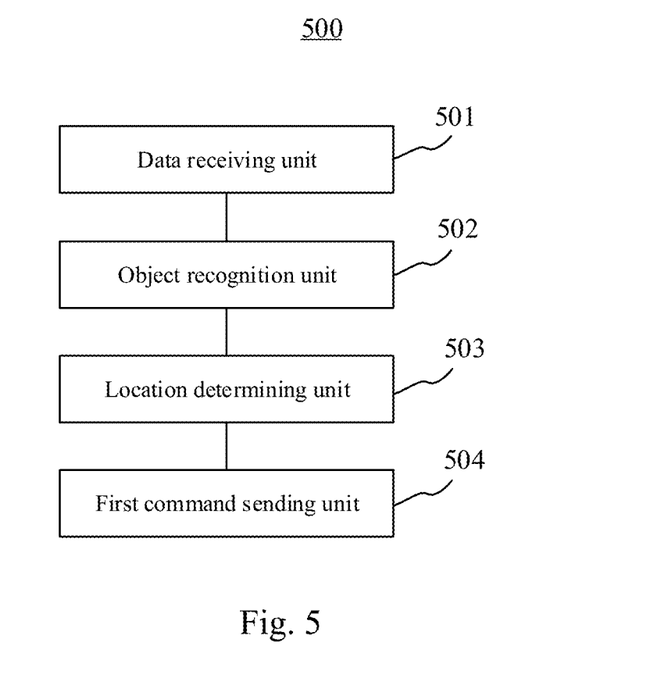
FIG. 5 is a schematic structural diagram of an apparatus for acquiring data according to an embodiment of the present disclosure.

With further reference to FIG. 5, as an implementation of the method shown in the above figures, some embodiments of the present disclosure provide an apparatus for acquiring data, and an embodiment of the apparatus may correspond to the method embodiment as shown in FIG. 2, and the apparatus may be specifically applied to various electronic devices.

As shown in FIG. 5, an apparatus 500 for acquiring data of some embodiments includes: a data receiving unit 501, an object recognition unit 502, a location determining unit 503 and a first command sending unit 504.

The data receiving unit 501 is configured to receive map data acquired by a data acquisition apparatus installed on a target unmanned aerial vehicle.

The object recognition unit 502 is configured to recognize an object in the map data and determine a type of the object.

The location determining unit 503 is configured to determine, in response to determining that the type of the object matches at least one type in a preset type sequence, a location of the at least one type in the type sequence.

The first command sending unit 504 is configured to send a flight height adjusting command to the target unmanned aerial vehicle, based on the location of the at least one type in the type sequence.

In some alternative implementations of some embodiments, the flight height adjusting command includes a flight height reducing command. The first command sending unit 504 may be further configured to: send the flight height reducing command to the target unmanned aerial vehicle, in response to determining that the location is before a preset location, to make the target unmanned aerial vehicle to reduce a flight height.

In some alternative implementations of some embodiments, the target unmanned aerial vehicle flies along a preset flight route, and the flight height adjusting command includes a flight height raising command. The first command sending unit 504 may further include a first determining module, a second determining module and a command sending module not shown in FIG. 5.

The first determining module is configured to determine an actual width of a ground road corresponding to the flight route.

The second determining module is configured to determine a width of a ground area corresponding to the map data as an acquisition width.

The command sending module is configured to send the flight height raising command to the target unmanned aerial vehicle, in response to determining that the location is after a preset location and the acquisition width is less than the actual width, to make the target unmanned aerial vehicle to raise a flight height.

In some alternative implementations of some embodiments, the apparatus 500 may further include a coincidence degree determining unit, a ratio determining unit and a second command sending unit not shown in FIG. 5.

The coincidence degree determining unit is configured to determine a coincidence degree of a ground road in the ground area corresponding to the map data and the ground road corresponding to the flight route.

The ratio determining unit is configured to determine a ratio of the acquisition width to the actual width.

The second command sending unit is configured to send a horizontal flight position adjusting command to the target unmanned aerial vehicle, in response to determining that the coincidence degree is less than the ratio.

In some alternative implementations of some embodiments, the apparatus 500 may further include a route output unit not shown in FIG. 5, configured to output the flight route, in response to determining that the acquisition width is less than the actual width.

In some alternative implementations of some embodiments, the apparatus 500 may further include a difference determining unit and a map generation unit not shown in FIG. 5.

The difference determining unit is configured to compare the acquired map data with pre-stored map data to determine a difference between the acquired map data and the pre-stored map data.

The map generation unit is configured to generate an electronic map based on the acquired map data, in response to determining that the difference satisfies a preset condition.

The apparatus for acquiring data provided by some embodiments of the present disclosure, first, may receive map data acquired by a data acquisition apparatus installed on a target unmanned aerial vehicle. Secondly, the apparatus may recognize an object in the map data and determine a type of the object. Then, the apparatus matches the type of the object and a preset type sequence. When it is determined that the type of the object matches at least one type in the preset type sequence, the apparatus determines the location of the at least one type in the type sequence. Finally, the apparatus sends a flight height adjusting command to the target unmanned aerial vehicle based on the location. Therefore, the apparatus may flexibly control the unmanned aerial vehicle to acquire map data of the ground, and the flight of the unmanned aerial vehicle is not limited by the ground traffic signal, thereby shortening the acquisition period of the map data.

It should be understood that the units 501 to 504 described in the apparatus 500 for acquiring data correspond to the steps in the method described with reference to FIG. 2, respectively. Thus, the operations and features described above for the method for acquiring data are equally applicable to the apparatus 500 and the units contained therein, and detailed description thereof will be omitted.

Figure 6:
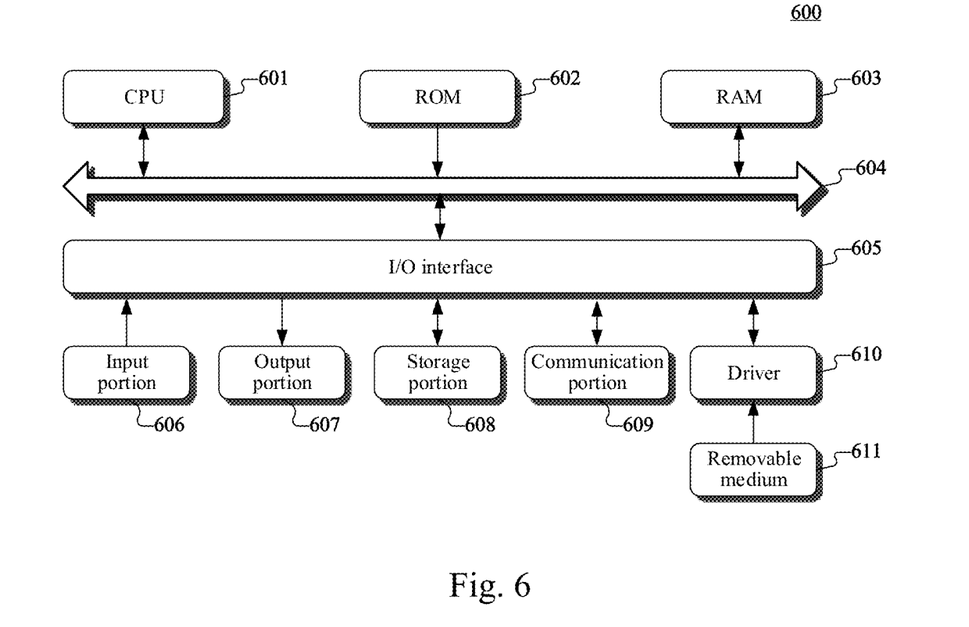
FIG. 6 is a schematic structural diagram of a computer system adapted to implement a server of some embodiments of the present disclosure.

With further reference to FIG. 6, a schematic structural diagram of a computer system 600 adapted to implement a server of some embodiments of the present disclosure is shown. The server shown in FIG. 6 is merely an example, and should not impose any limitation on the function and scope of use of some embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including such as a keyboard, a mouse; an output portion 607 including such as a cathode ray tube (CRT), a liquid crystal display device (LCD), a speaker, etc.; a storage portion 608 including a hard disk or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the methods of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above.

In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in some embodiments of the present disclosure may be implemented by means of software or hardware. The described units may also be provided in a processor, for example, may be described as: a processor including a data receiving unit, an object recognition unit, a location determining unit and a first command sending unit. Here, the names of these units do not in some cases constitute limitations to such units themselves. For example, the data receiving unit may also be described as "a unit for receiving map data acquired by a data acquisition apparatus installed on a target unmanned aerial vehicle."

In another aspect, some embodiments of the present disclosure further provide a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: receive map data acquired by a data acquisition apparatus installed on a target unmanned aerial vehicle; recognize an object in the map data and determine a type of the object; determine, in response to determining that the type of the object matches at least one type in a preset type sequence, a location of the at least one type in the type sequence; and send a flight height adjusting command to the target unmanned aerial vehicle, based on the location of the at least one type in the type sequence.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for acquiring data, the method comprising:
   receiving map data acquired by a data acquisition apparatus installed on a target unmanned aerial vehicle, wherein the target unmanned aerial vehicle flies along a preset flight route;
   recognizing objects in the map data and determining types of the recognized objects;
   in response to determining that the determined types of the recognized object match at least one preset type in a preset type sequence, determining a location of the at least one preset type in the preset type sequence, wherein preset types in the preset type sequence are sorted according to sizes of objects corresponding to the preset types in descending order; and
   sending a flight height adjusting command to the target unmanned aerial vehicle, based on a preset location in the preset type sequence and the determined location of the at least one preset type in the preset type sequence,
   wherein the method further comprises:
   determining an actual width of a ground road corresponding to the flight route;
   determining a width of a ground area corresponding to the map data as an acquisition width;
   determining a coincidence degree of a ground road in the ground area corresponding to the map data and the ground road corresponding to the flight route;
   determining a ratio of the acquisition width to the actual width; and
   sending a horizontal flight position adjusting command to the target unmanned aerial vehicle, in response to determining that the coincidence degree is less than the ratio.

2. The method according to claim 1, wherein the flight height adjusting command comprises a flight height reducing command; and
   the sending a flight height adjusting command to the target unmanned aerial vehicle, based on the preset location in the preset type sequence and the determined location of the at least one type in the preset type sequence, comprises:
   sending the flight height reducing command to the target unmanned aerial vehicle, in response to determining that the determined location is before the preset location, to make the target unmanned aerial vehicle to reduce a flight height.

3. The method according to claim 1, wherein the flight height adjusting command comprises a flight height raising command; and
   the sending a flight height adjusting command to the target unmanned aerial vehicle, based on the preset location in the preset type sequence and the determined location of the at least one type in the preset type sequence, comprises:
   sending the flight height raising command to the target unmanned aerial vehicle, in response to determining that the determined location is after the preset location and the acquisition width is less than the actual width, to make the target unmanned aerial vehicle to raise a flight height.

4. The method according to claim 3, wherein the method further comprises:
   outputting the flight route, in response to determining that the acquisition width is less than the actual width.

5. The method according to claim 1, wherein the method further comprises:
   comparing the acquired map data with pre-stored map data to determine a difference between the acquired map data and the pre-stored map data; and
   generating an electronic map based on the acquired map data, in response to determining that the difference satisfies a preset condition.

6. An apparatus for acquiring data, the apparatus comprising:
   at least one processor; and
   a memory storing instructions, the instructions when executed by the at least one processor, cause the at least one processor to perform operations, the operations comprising:
   receiving map data acquired by a data acquisition apparatus installed on a target unmanned aerial vehicle, wherein the target unmanned aerial vehicle flies along a preset flight route;
   recognizing objects in the map data and determine types of the recognized objects;
   in response to determining that the determined types of the recognized object match at least one preset type in a preset type sequence, determining a location of the at least one preset type in the preset type sequence, wherein preset types in the preset type sequence are sorted according to sizes of objects corresponding to the preset types in descending order; and
   sending a flight height adjusting command to the target unmanned aerial vehicle, based on a preset location in the preset type sequence and the determined location of the at least one preset type in the preset type sequence,
   wherein the operations further comprise:
   determining an actual width of a ground road corresponding to the flight route;
   determining a width of a ground area corresponding to the map data as an acquisition width;
   determining a coincidence degree of a ground road in the ground area corresponding to the map data and the ground road corresponding to the flight route;
   determining a ratio of the acquisition width to the actual width; and
   sending a horizontal flight position adjusting command to the target unmanned aerial vehicle, in response to determining that the coincidence degree is less than the ratio.

7. The apparatus according to claim 6, wherein the flight height adjusting command comprises a flight height reducing command; and
   the sending a flight height adjusting command to the target unmanned aerial vehicle, based on the preset location in the preset type sequence and the determined location of the at least one type in the preset type sequence, comprises:
   sending the flight height reducing command to the target unmanned aerial vehicle, in response to determining that the determined location is before the preset location, to make the target unmanned aerial vehicle to reduce a flight height.

8. The apparatus according to claim 6, wherein the flight height adjusting command comprises a flight height raising command; and the sending a flight height adjusting command to the target unmanned aerial vehicle, based on the preset location in the preset type sequence and the determined location of the at least one type in the preset type sequence, comprises:

sending the flight height raising command to the target unmanned aerial vehicle, in response to determining that the determined location is after the preset location and the acquisition width is less than the actual width, to make the target unmanned aerial vehicle to raise a flight height.

9. The apparatus according to claim 8, wherein the operations further comprise:

outputting the flight route, in response to determining that the acquisition width is less than the actual width.

10. The apparatus according to claim 6, wherein the operations further comprise:

comparing the acquired map data with pre-stored map data to determine a difference between the acquired map data and the pre-stored map data; and generating an electronic map based on the acquired map data, in response to determining that the difference satisfies a preset condition.

11. A non-transitory computer readable medium, storing a computer program thereon, the computer program, when executed by a processor, causes the processor to perform operations, the operations comprising:

receiving map data acquired by a data acquisition apparatus installed on a target unmanned aerial vehicle, wherein the target unmanned aerial vehicle flies along a preset flight route;

recognizing objects in the map data and determining types of the recognized objects;

in response to determining that the determined types of the recognized object match at least one preset type in a preset type sequence, determining a location of the at least one preset type in the preset type sequence, wherein preset types in the preset type sequence are sorted according to sizes of objects corresponding to the preset types in descending order; and sending a flight height adjusting command to the target unmanned aerial vehicle, based on a preset location in the type sequence and the determined location of the at least one preset type in the preset type sequence, wherein the operations further comprise:

determining an actual width of a ground road corresponding to the flight route;

determining a width of a ground area corresponding to the map data as an acquisition width;

determining a coincidence degree of a ground road in the ground area corresponding to the map data and the ground road corresponding to the flight route;

determining a ratio of the acquisition width to the actual width; and sending a horizontal flight position adjusting command to the target unmanned aerial vehicle, in response to determining that the coincidence degree is less than the ratio.

* * * * *